United States Patent
Zhao et al.

(10) Patent No.: US 9,876,498 B2
(45) Date of Patent: Jan. 23, 2018

(54) PHYSICALLY UNCLONABLE PRODUCT AND FABRICATION METHOD THEREOF

(71) Applicants: Semiconductor Manufacturing International (Beijing) Corporation, Beijing (CN); Semiconductor Manufacturing International (Shanghai) Corporation, Shanghai (CN)

(72) Inventors: Lian Guo Zhao, Shanghai (CN); Kun Peng, Shanghai (CN); Xiang Hu, Shanghai (CN); Hai Lian Wang, Shanghai (CN)

(73) Assignees: SEMICONDUCTOR MANUFACTURING INTERNATIONAL (BEIJING) CORPORATION, Beijing (CN); SEMICONDUCTOR MANUFACTURING INTERNATIONAL (SHANGHAI) CORPORATION, Shanghai (CN)

( * ) Notice: Subject to any disclaimer, the term of this patent is extended or adjusted under 35 U.S.C. 154(b) by 0 days.

(21) Appl. No.: 15/332,866

(22) Filed: Oct. 24, 2016

(65) Prior Publication Data

US 2017/0155389 A1    Jun. 1, 2017

(30) Foreign Application Priority Data

Dec. 1, 2015 (CN) .......................... 2015 1 0867349

(51) Int. Cl.
| | | |
|---|---|---|
| *H03K 19/00* | (2006.01) | |
| *H03K 19/003* | (2006.01) | |
| *H01L 23/00* | (2006.01) | |
| *H04L 9/32* | (2006.01) | |
| *G09C 1/00* | (2006.01) | |

(52) U.S. Cl.
CPC .......... *H03K 19/0005* (2013.01); *G09C 1/00* (2013.01); *H01L 23/576* (2013.01); *H03K 19/003* (2013.01); *H04L 9/3278* (2013.01); *H04L 2209/12* (2013.01)

(58) Field of Classification Search
None
See application file for complete search history.

(56) References Cited

U.S. PATENT DOCUMENTS

| | | | |
|---|---|---|---|
| 9,059,188 B1 * | 6/2015 | Dimitrakopoulos | .. H01L 23/573 |
| 2011/0254141 A1 | 10/2011 | Roest et al. | |
| 2014/0042628 A1 | 2/2014 | Edelstein | |
| 2015/0137380 A1 | 5/2015 | in 't Zandt et al. | |

FOREIGN PATENT DOCUMENTS

| | | |
|---|---|---|
| KR | 101442401 B1 | 9/2014 |
| WO | 2015030454 A1 | 3/2015 |

* cited by examiner

*Primary Examiner* — Jany Richardson
(74) *Attorney, Agent, or Firm* — Anova Law Group, PLLC

(57) ABSTRACT

The present disclosure provides physically unclonable products and fabrication methods thereof. An exemplary fabrication method forming a resistor block; performing a resistance randomizing process to the resistor block to cause the resistor block to have a random resistance; forming a resistor block array using at least two resistor blocks obtained after the resistance randomizing process; and coupling at least one resistor block array with a product to form the physically unclonable product.

19 Claims, 5 Drawing Sheets

PHYSICALLY UNCLONABLE PRODUCT AND FABRICATION METHOD THEREOF

CROSS-REFERENCES TO RELATED APPLICATIONS

This application claims the priority of Chinese patent application No. 201510867349. X, filed on Dec. 1. 2015, the entirety of which is incorporated herein by reference.

FIELD OF THE INVENTION

The present invention generally relates to the field a semiconductor technology and, more particularly, relates to physically unclonable products and fabrication methods thereof.

BACKGROUND

With the continuous development of electronic technologies, physical entities, such as intelligent cards and radio frequency identification cards, etc., have been widely used. However, current physical entities have certain risks as easily being cracked and cloned.

Physically unclonable technique is used to protect personal chips and to prevent the data theft. The physically unclonable technique utilizes the intrinsic and exclusive "finger print" of semiconductor devices to protect its encrypted key; and cause the encrypted key to be difficult to duplicate. Accordingly, the physically unclonable technique is able to effectively protect the users' data files.

However, how to achieve physically unclonable function is still an urgent task. The disclosed physically unclonable products and fabrication methods are directed to solve one or more problems set forth above and other problems in the art.

BRIEF SUMMARY OF THE DISCLOSURE

One aspect of the present disclosure includes a method for fabricating a physically unclonable product. The method includes a resistor block; performing a resistance randomizing process to the resistor block to cause the resistor block to have a random resistance; forming a resistor block array using at least two resistor blocks obtained after the resistance randomizing process; and coupling at least one resistor block array with a product to form the physically unclonable product Another aspect of the present disclosure includes a physically unclonable product. The physically unclonable product includes a product; and at least one resistor block array coupled with the product and including at least two resistor blocks having randomized resistances.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Physically unclonable technique may be used to protect personal chips, and prevent the data theft. The physically unclonable technique utilizes the intrinsic and exclusive "finger print" of semiconductor devices to protect its encrypted key; and cause the encrypted key to he difficult to duplicate. Accordingly, the physically unclonable technique is able to effectively protect users' data files. With the continuous development of electronic technologies, physical entities, such as intelligent cards and radio frequency identification cards, etc., have been widely used. However, the current physical entities have certain risks as easily being cracked and cloned. Thus, how to achieve physically unclonable function is still an urgent task.

The present disclosure provides physically unclonable products and methods for fabricating the physically unclonable products. A resistance randomizing process may be performed on resistor blocks to cause the resistor block to have a random resistance. Then, two or more resistor blocks with the randomized resistances may be used to form a resistor block array. Then, at least one such resistor block array may be disposed in a product; and a physically unclonable product may be formed. Because the resistances of the resistor blocks may be completely random, i.e., the resistances of the resistor blocks formed by same parameters may not be same, or may be uncertain. Thus, the uniqueness and unclonable function of the resistor block array may be ensured. The resistor block array may be disposed in a product to form a physically unclonable product.

Figure 1:
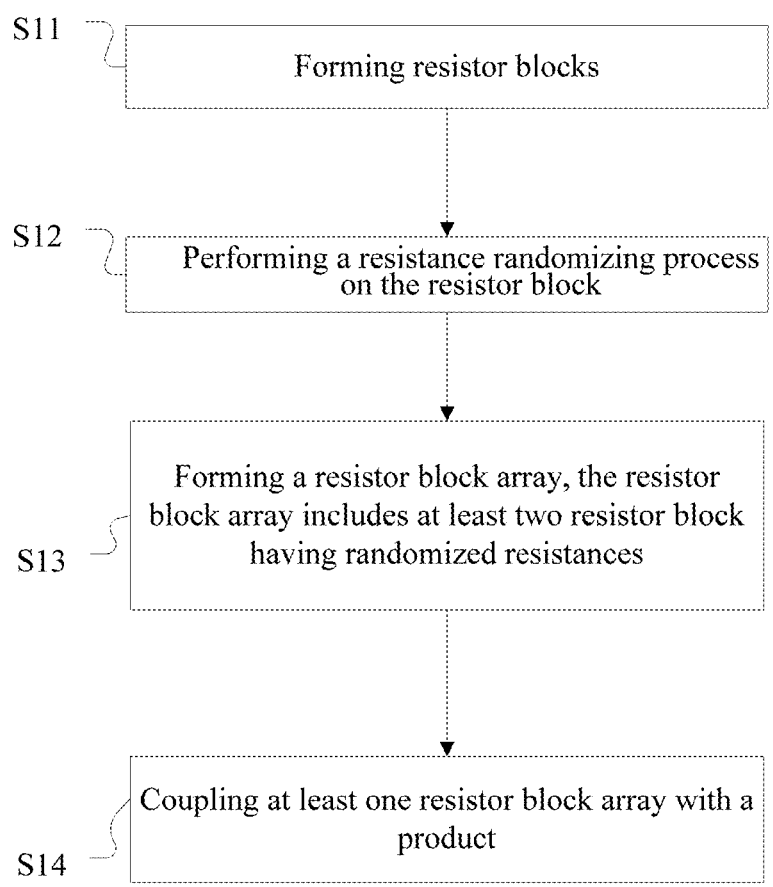
FIG. 1 illustrates a flow chart of an exemplary fabrication process of a physically unclonable product consistent with the disclosed embodiments.

FIG. 1 illustrates a flow chart of an exemplary fabrication process of a physically unclonable product consistent with the disclosed embodiments. As shown FIG. 1, at the beginning of the fabrication process, a resistor block may be formed (S11).

Because the physically unclonable approach may need to utilize the randomicity of resistance of the resistor block, one or more resistor blocks may need to be formed. The resistor block may be a conductive plate with an electrical resistance. It may be convenient to perform certain treatment processes to the conductive plate with the certain resistance.

The resistor block may be made of any appropriate material, such as polysilicon, or metal, etc. In one embodiment, to reduce the production cost and the complexity of the subsequent treatment processes, polysilicon may be used as an example for forming the resistor block.

For illustrative purposes, polysilicon will he used as an example to describe the fabrication process of the resistor blocks and the physically unclonable products. In certain embodiments, other appropriate electrically conductive materials may be also used and included in the present disclosure according to various embodiments.

Further, as shown in FIG. 1, after forming the resistor blocks, a resistance randomizing process may be performed on the resistor blocks (S12). In one embodiment, to cause the plurality of resistor block to have a uniqueness and unclonable function, a resistance randomizing process may be performed onto the resistor block to cause the resistor block to have a random resistance; or to cause a plurality of resistor blocks originally having a same resistance to have random resistances.

The resistance randomizing process of the resistor block may be any appropriate process. The resistance randomizing process may be selected according to the shape and the composition of the resistor block.

In one embodiment, a photoresist treatment process may be performed on the resistor block. Specifically, a photolithography process may be performed onto the resistor block. During the photolithography process, according to the shape and structure of the resistor blocks, a certain adjustment may be performed to the photoresist treatment process (or the photolithography process). The adjustment may cause the exposing energy of the photolithography process to be unable to completely expose portions of the photoresist layer on the resistor block corresponding to the need-to-be-exposed regions (or patterns) on the photomask. After an etching process, random patterns may be formed in the resistor block, or the resistor block may be changed into a random shape. Thus, the resistance of the resistor block may become random and/or the plurality of resistor blocks originally having a same resistance may become a plurality of resistor blocks haying random resistances (or uncertain resistance). After the etching process, the photoresist layer may be removed by appropriate process.

In one embodiment, the need-to-be-exposed regions (or patterns) on the photomask may correspond to certain positions of the resistor blocks. Under such a condition, a few methods may be used to cause the energy to expose the photoresist on the resistor block to be unable to completely expose the portions of the photoresist corresponding to the need-to-be-exposed patterns on the photomask.

In a certain energy range of the exposure light of the photolithography process, the exposure ability of the exposure light may be limited. When the size of the patterns in the exposure area is reduced to a certain value by adjusting the size of the exposure regions of the photomask, the exposure of the photolithography process may have a bottleneck (or a critical value). Such a bottleneck may cause portions of the photoresist layer corresponding to certain patterns on the photomask may be completely exposed; and portions of the photoresist layer corresponding to certain patterns on the photomask may not be completely exposed, or may not be exposed. The polysilicon (for forming the resistor blocks) under the completely exposed regions may be etched away during a subsequent etching process; and the polysilicon under partially exposed region may be kept, or may be partially etched away during the subsequent etching process. Thus, the resistance of the resistor block may be affected or changed. Further, the bottleneck condition may be a critical condition. Even a photolithography process with same parameters is performed twice on a same resistor blocks, or on different resistors having a same geometry and a same resistance, the resistor block or resistor blocks after the photolithography process may have different random shapes and sizes. Accordingly, the resistances of the treated resistor blocks may not be identical; and the resistances may be random, or otherwise uncertain. Thus, the resistor blocks may have uniqueness and an unclonable function after the photoresist treatment process.

In certain other embodiments, if the size of the need-to-be-exposed patterns on the photomask is kept as the unchanged, adjusting the exposure energy may be able to completely expose portions of the photoresist on the resistor block and partially expose portions of the photoresist on the resistor block. Thus, adjusting the exposure energy and/or adjusting the size of need-to-be exposed patterns on the photomask may be able to cause the photoresist layer corresponding to the need-to-be-exposed patterns on the photomask not to be completely exposed.

Figure 2:
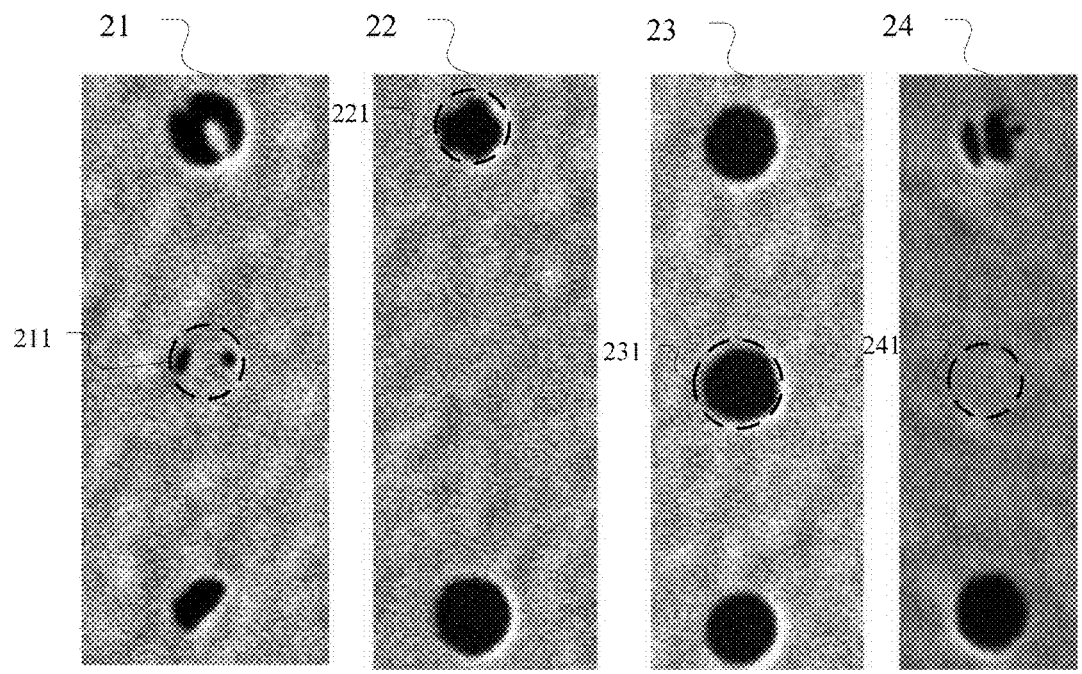
FIG. 2 illustrates an exemplary resistor block after a photoresist treatment process consistent with the disclosed embodiments.

FIG. 2 illustrates exemplary resistor blocks 21-24 treated by the above described resistance randomizing process, i.e., the photoresist treatment process. As shown in FIG. 2, after a same resistance randomization process, a portion of a resistor block may be completely exposed to form a complete pattern, such as the region 231 in the resistor block 23. A portion of the resistor block may be partially exposed to form a non-complete pattern, such as the region 211 in the resistor block 21 and the region 221 in the resistor block 22. A portion of the resistor block may not be exposed, forming no patter, such as the region 241 in the resistor block 24. Thus, when the original resistor blocks 21-24 have a same resistance, the resistances of the resistor blocks 21-24 after the photoresist treatment process may not be same, i.e., may be unclonable.

The regions illustrated in FIG. 2 are for illustrative purposes only. In other embodiments, the regions may be at any random positions on the resistor blocks.

In one embodiment, each resistor block may include at least two resistor block units: a first resistor block unit and a second resistor block unit. The two resistor block units may be parallel; and there may be a space between the two resistor block units. The need-to-be-exposed regions (patterns) on the photomask may correspond to the space between the two parallel resistor block units. A few methods may be used to cause the exposure energy of the photolithography process (the photoresist treatment process) to be unable to completely expose the portion of the photoresist corresponding to the space between the first resistor block unit and the second resistor block unit.

In a certain energy range of the exposure process to the photoresist treatment process performed on the resistor blocks, the exposure ability of the photolithography process may be limited. Thus, the patterns adjacent to the exposed regions on the resistor blocks may affect the exposure affect. When the patterns in the non-exposed regions are relatively long, the design of the relatively small space between the two resistor block units may deform the exposed patterns. Thus, the two adjacent resistor block units may be bridged; and the resistances of the resistor blocks connected in the circuit may be affected. Such a condition may he a critical condition; and the resistances of the resistor blocks formed by same parameters may not be completely same. Thus, the uniqueness and unclonable function of the resistor blocks may be ensured.

In certain embodiments, if the sizes of the need-to-be-exposed patterns in the photomask remain unchanged, adjusting the exposure energy of the photoresist treatment process may also he able to completely expose portions of the photoresist and partially expose portions of the photoresist. Thus, adjusting the exposure energy or the adjusting the size of need-to-be-exposed patterns on the photomask may both be able to cause the photoresist layer corresponding to the need-to-be-exposed patterns on the photomask to he partially exposed, e.g., some portions are completely exposed; and some portions are not completely exposed.

Figure 3:
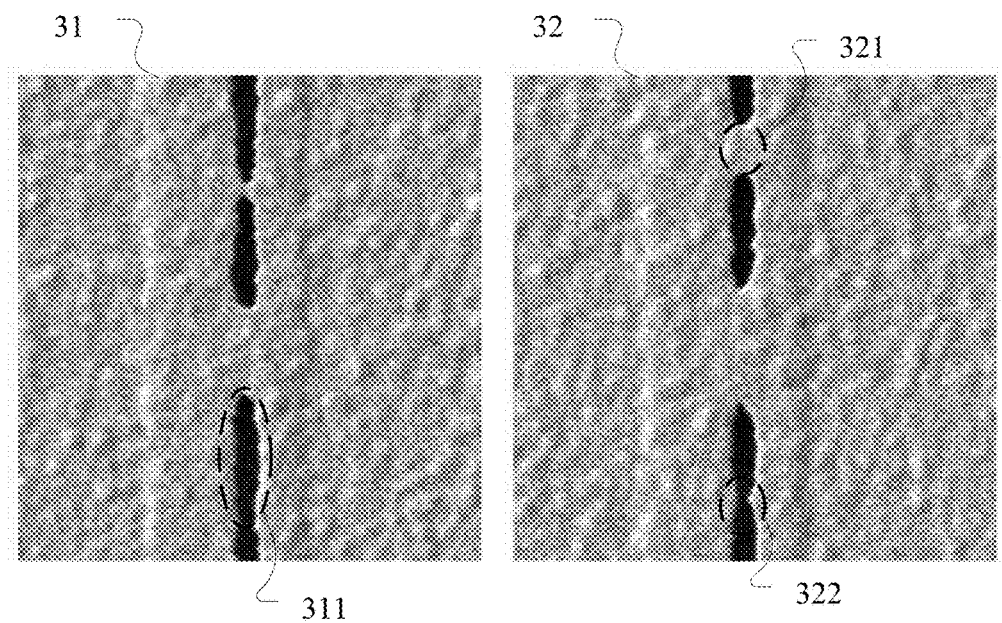
FIG. 3 illustrates another exemplary resistor block after a photoresist treatment process consistent with the disclosed embodiments.

FIG. 3 illustrates the resistor blocks 31-32 processed by the above described photoresist treatment process. As shown in FIG. 3, after the resistance randomizing process, portions of the space between adjacent resistor blocks may be partially exposed, as illustrated by the region 322 in the resistor block 32. Portions of the space between the adjacent resistor blocks may not be exposed, as illustrated by the region 321 in the resistor block 32. Portions of the space between the adjacent resistor blocks may be completely exposed, as illustrated by the region 311 in the resistor block 311. Thus, the resistances of the resistor blocks may not be identical, i.e., may be unclonable.

In certain embodiments, each resistor block may include at least two long-stripe resistor block units: a third resistor block unit and a fourth resistor block unit. The third resistor block unit may connect with the fourth resistor block unit; and the width of the third resistor block unit may be greater than the width of the fourth resistor block unit. The need-to-be-exposed regions on the photomask may correspond to certain positions on the two resistor blocks, respectively. A few methods may be used to cause the exposure energy to be unable to completely expose portions of the photoresist on the two resistor blocks corresponding to the need-to-be-exposed patterns on the photomask.

In a certain energy range of the photoresist treatment process to the photoresist layer on the resistor blocks, the exposure ability of the photolithography process may be limited. Thus, the patterns adjacent to the exposed regions on the resistor blocks may affect the exposure affect. When the patterns in the non-exposed regions are relatively thin (i.e., the width is relatively small), the thin stripes may have risk and possibility to be broken. When the width of the patterns are relatively large (or thick) and the relative distance between two adjacent resistor block units is relatively small, the resistor block units having the different widths may have the risk and possibility of being bridged. Such a condition may be a critical condition, the resistances of the resistor blocks treated by same parameters may not be completely same. Thus, the uniqueness and unclonable function of the resistor blocks may be ensured. When the relative distance between the resistor block units is kept as a constant, such effects may be achieved by adjusting the exposure energy of the photolithography process for treating the resistor blocks.

Thus, the exposure energy or the relative distance between the resistor block units may be adjusted to randomize the resistances of the resistor blocks originally having a same resistance. The adjustment may cause the third resistor block unit and the fourth resistor block unit to be bridged, and/or cause the fourth resistor block unit to be broken.

Therefore, by using the photoresist treatment process, the relatively thin polysilicon resistor block may be partially broken and the relatively wide resistor block may be partially bridged. Thus, the resistances of the resistor blocks after the photoresist treatment process may not be completely repeated (or same).

Further, in one embodiment, before performing the photoresist treatment process on the resistor blocks, a doping process may be performed on the resistor blocks. The doping process may also be able to cause the resistances of the resistor blocks to have a randomicity.

For example, the resistor block may be doped to cause the doped regions to have a higher etching rate than the un-doped region. Then, the doped resistor block may be etched. By adjusting the parameters of the etching process, the critical dimension of the top of the etched resistor block may be smaller than the critical dimension of the bottom of the etched resistor block.

In one embodiment, portions of the surface of the polysilicon resistor block may, be doped with a certain type of ions. During an etching process, the etching rate in the doped regions may be greater than the etching rate of the un-doped regions. By adjusting the etching parameters, the cross-sectional view of the resistor block may present different shapes, such a bottle shape, etc. The critical dimension of the top of the resistor block with the bottle shape may be difficult to control. Thus, the resistance of the resistor block may be affected, and may be with a randomicity. Because such a condition may also be a critical condition. The resistances of the resistor blocks treated by same parameters may still be different; and may not be repeated. Thus, the uniqueness and the unclonable function of the resistor blocks may be ensured.

Figure 4:
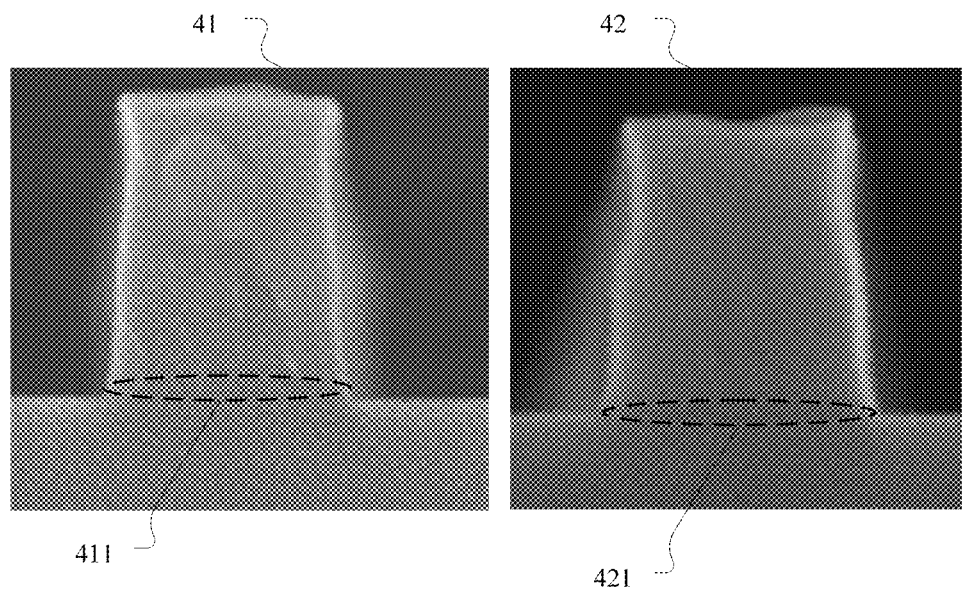
FIG. 4 illustrates another exemplary resistor block after a photoresist treatment process consistent with the disclosed embodiments.

FIG. 4 illustrates exemplary cross-sectional views of the resistor blocks processed by the above-described process, the photoresist treatment process and the doping process. As shown in FIG. 4, the resistor block 41 and the resistor block 42 may present a bottle shape after being treated by a same process. The critical dimension of the resistor block 41 and the critical dimension of the resistor block 42 may be different. For example, the region 411 in the resistor block 41 and the region 421 in the resistor block 42 may be different. Thus, the resistances of the resistor blocks after the treatment process may not be completely repeated.

Returning to FIG. 1, after performing the resistance randomizing process, a resistor block array may be formed (S13). The resistor block array may include at least two resistor blocks that are processed to have random resistances. The two resistor blocks may be referred to as a first resistor block and a second resistor block. When the resistance of the first resistor block is greater than the resistance of the second resistor block. The output of the resistor block array may be "1". When the resistance of the first resistor block is smaller than the resistance of the second resistor block, the output of the resistor block array may be "0".

In one embodiment, because the resistances of the resistor blocks after the resistance randomizing process may be random values, the first resistor block and the second resistor block after the resistance randomizing process may be used to form the resistor block array. When the resistance of the first resistor block is greater than the resistance of the second resistor block, the output of the resistor block array may be "1". When the resistance of the first resistor block is smaller than the resistance of the second resistor block, the output of the resistor block array may be "0". Because the resistances of the resistor blocks may be random, the output of the resistor block array may also be random. Thus, the output of the resistor block array may be used as a password.

Figure 5:
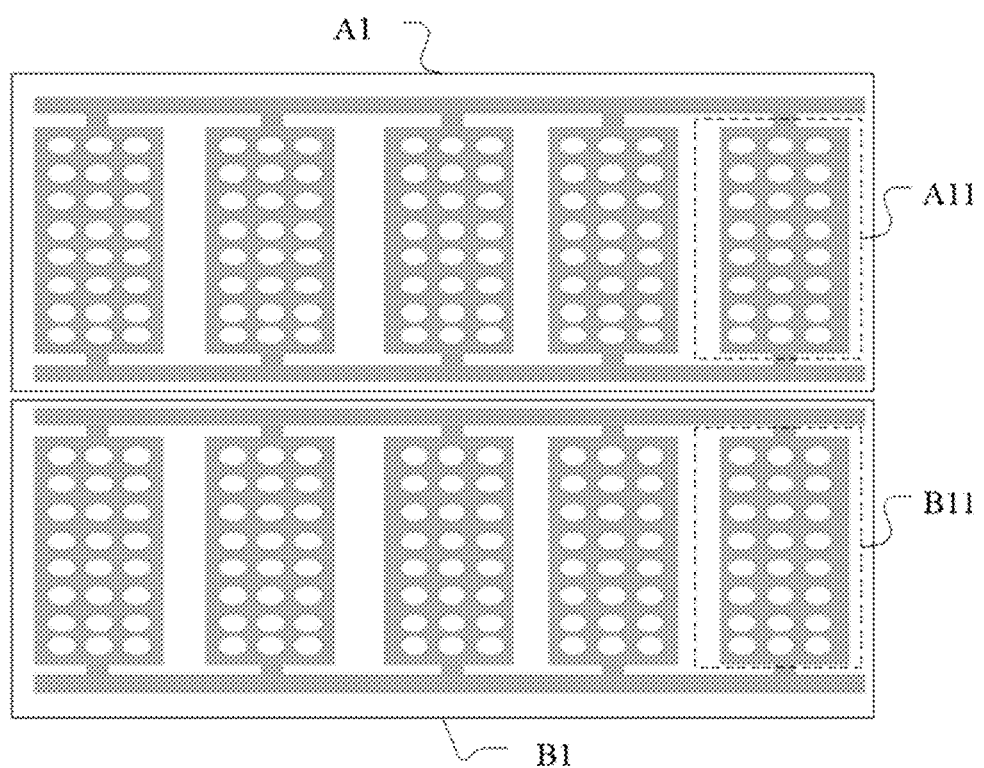
FIG. 5 illustrates an exemplary resistor block array consistent with the disclosed embodiments.

FIG. 5 illustrates a resistor block array A1 and a resistor block array B1 of an exemplary physically unclonable product consistent with the disclosed embodiments. The resistor block array A1 may include at least two resistor blocks A11. The resistor block array B1 may include at least two resistor blocks B11. The resistor blocks A11 and the resistor blocks B11 may all be processed by the resistance randomizing process similar to the resistor blocks illustrated in FIG. 2. Thus, the output of the resistor block array A1 and the output of the resistor block array B1 may both have the uniqueness and may be both unclonable.

Referring to FIG. 2 and FIG. 5, by utilizing the unstable results caused by the critical status of the photoresist treatment process (the photolithography process) outside a working range, the resistance difference of the polysilicon layers with different shapes may be obtained. The resistance difference may be used in the hardware security verification. The polysilicon resistor block array with holes may be deigned. By adjusting sizes of the patterns on the photomask corresponding to the holes, some of the designed holes in the polysilicon resistor blocks may be open; and some may not be open, or may be partially open. Thus, the resistances of the polysilicon resistor blocks may be random. Accordingly, the polysilicon resistor blocks may have a completely randomicity.

Figure 6:
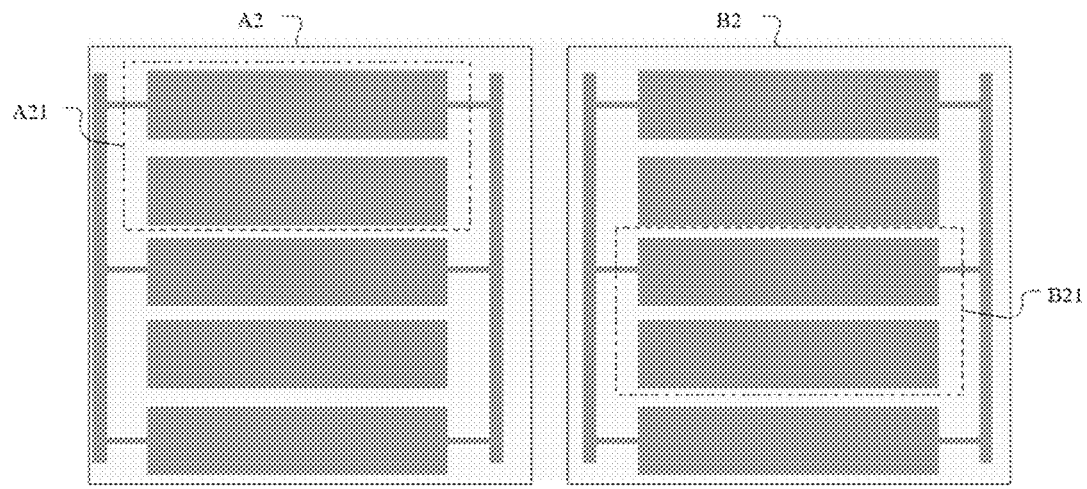
FIG. 6 illustrates another exemplary resistor block array consistent with the disclosed embodiments.

FIG. 6 illustrates a resistor block array A2 and a resistor block B2 of an exemplary physically unclonable product consistent with the disclosed embodiments. The resistor block array A2 may include at least two resistor blocks A21. The resistor block array B2 may include at least two resistor blocks B21. The resistor blocks A21 and the resistor blocks B21 may all be processed by the resistance randomizing process similar to the resistor blocks illustrated in FIG. 3. Thus, the output of the resistor block array A2 and the output of the resistor block array B2 may both have the uniqueness and may be both unclonable.

Referring to FIG. 3 and FIG. 6, by utilizing the unstable results caused by the critical status of the photolithography process outside a working range, i.e., the polysilicon bridging caused by the image deformation during the photolithography process, the resistance difference between the polysilicon layers may be obtained. Thus, in the practical application, a resistor block array having relatively large size of polysilicon layers may be designed. The polysilicon layers having the relatively large size may be parallel and may have relatively small distances. By adjusting the distances between the polysilicon layers, some portions of the space between adjacent polysilicon layers may not be completely exposed, and the adjacent polysilicon layers may be bridged. Thus, the resistances of the resistor blocks connected into the circuit may be affected.

Figure 7:
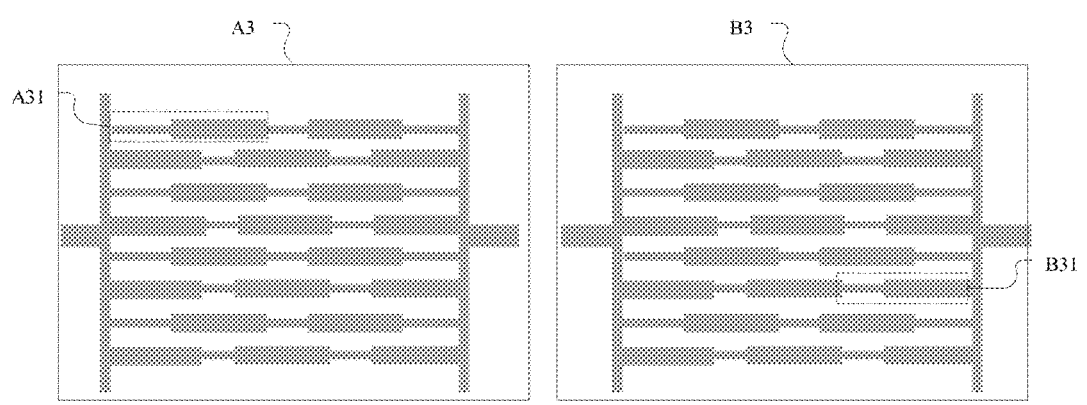
FIG. 7 illustrates another exemplary resistor block array consistent with the disclosed embodiments.

FIG. 7 illustrates a resistor block array A3 and a resistor block array B3 of an exemplary physically unclonable product consistent with the disclosed embodiments. The resistor block array A3 may include at least two resistor blocks A31. The resistor block array B3 may include at least two resistor blocks B31. The resistor blocks A31 and the resistor blocks B31 may all be processed by a same resistance randomizing process. Thus, the output of the resistor block array A2 and the output of the resistor block array B2 may both have the uniqueness and may be both unclonable.

Referring to FIG. 7, by utilizing the unstable results caused by the critical status of the photolithography process outside a working range, that is, the polysilicon layers may be bridged or broken because of the image deformation during the photolithography process, the resistance difference of the polysilicon layers may be obtained. The resistance difference may be used for the safety verification of hardware. Polysilicon resistor blocks with larger and smaller widths presenting with intervals may be designed. Because the resistor blocks with the larger and smaller widths may have different responses to the exposure energy of the photolithography process, when the exposure energy of the photolithography process is in a certain range, the resistor block having the smaller width may have the risk and possibility to be broken; and the resistor block having the larger width may have the risk of being bridged. The resistances of the resistor blocks connected in a circuit may be different. If the resistance of the resistor block array A3 is greater than the resistance of the resistor block array B3, the output of the resistor block array may be "1". If the resistance of the resistor array A3 is smaller than the resistance of the resistor array B3, the output of the resistor block array may be "0". By designing n groups of (A3+B3), a password of an identification verification may be obtained.

Figure 8:
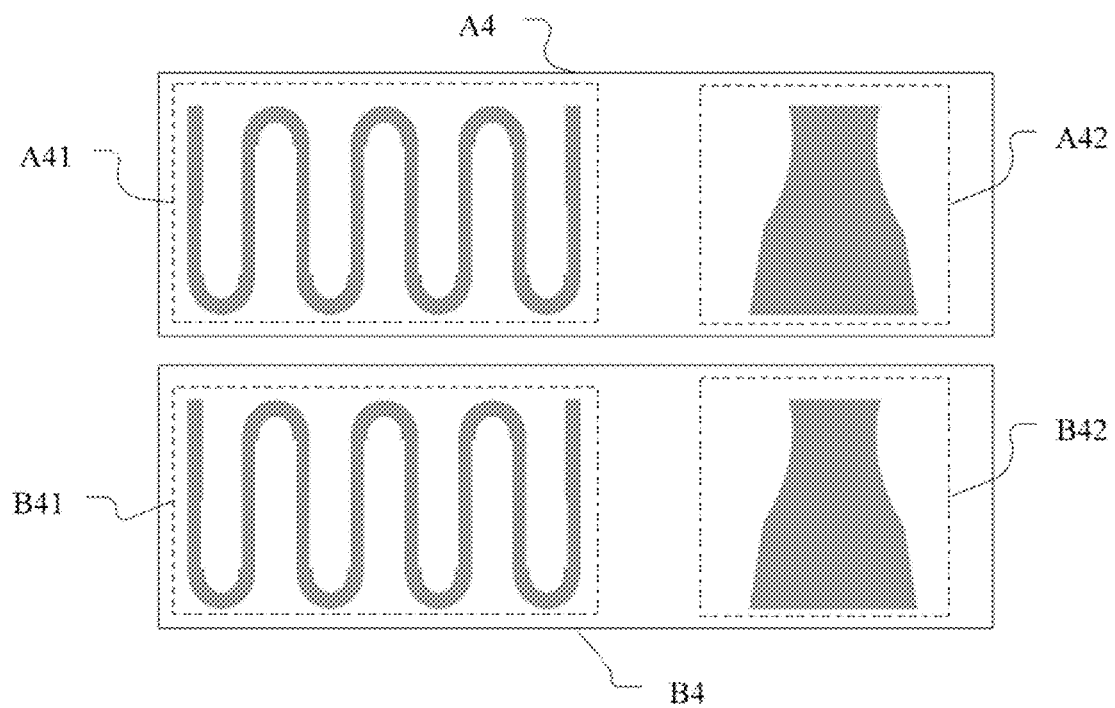
FIG. 8 illustrates another exemplary resistor block array consistent with the disclosed embodiments.

FIG. 8 illustrates a resistor block array A4 and a resistor block array B4 of an exemplary physically unclonable product consistent with the disclosed embodiments. The resistor block A41 and the resistor block A42 may be the different cross-sectional views of a same resistor block. The resistor block B41 and the resistor block B42 may be the different cross-sectional views of a same resistor block. The resistor block array A4 may include at least two resistor blocks A42. The resistor block B4 may include at least two resistor blocks B42. The resistor blocks A42 and the resistor blocks B41 may be processed by a resistance randomizing process similar to the resistor block illustrated in FIG. 4. Thus, the output values of the resistor block array A4 and the resistor block B4 may all have uniqueness and have the unclonable function.

Referring to FIG. 4 and the FIG. 8, by randomly doping the polysilicon layers, the etching rate of the doped regions in the polysilicon layers may be increased. Thus, different shapes of the polysilicon layers may be formed under a same etching condition, i.e., random critical dimensions at different positions. The random critical dimensions at different positions may cause the resistances of the resistor blocks to be different. The resistance difference may be used for a safety verification of hardware. An S-shaped polysilicon resistor block array may be designed. The surfaces of the S-shaped polysilicon resistor blocks may be randomly doped. When an etching process is performed on the S-shaped polysilicon resistor blocks, the etching rate of the doped regions may be greater than the etching rate of the un-doped regions. By adjusting the etching parameters, certain shapes of the polysilicon layers, such as a bottle shape, may be formed. Because the critical dimension of the top of the shape (e.g., the bottle shape) may be difficult to control, the resistances of the resistor blocks may be affected; and may have random values.

Returning to FIG. 1, after forming the resistor block array, at least one resistor block array may be disposed in a product; and a physically unclonable product may be formed (S14). Because the output of the resistor block array may have a uniqueness and unclonable function, when the at least one resistor block array is disposed in the product, a physically unclonable product may be formed.

By using an array comparison approach, the definition of the password length may be defined. Thus, the method for forming the physically unclonable product may be able to achieve the application of a large digit password.

Figure 9:
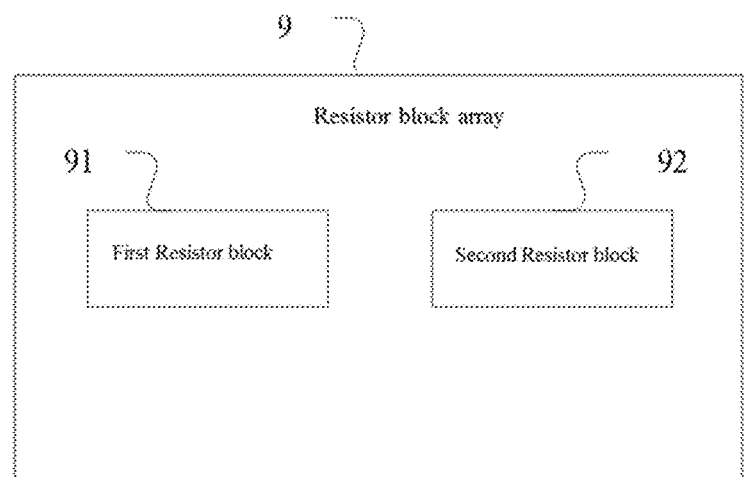
FIG. 9 illustrates an exemplary physically unclonable product consistent with the disclosed embodiments.

Thus, a physically unclonable product may be formed by the disclosed methods and processes. FIG. 9 illustrates a corresponding physically unclonable product consistent with the disclosed embodiments.

As shown in FIG. 9, the physically unclonable product may include at least one resistor block array 9. The resistor block array 9 may include at least a first resistor block 91 and a second resistor block 92. The two resistor blocks may have randomized resistances. When the resistance of the first resistor block 91 is greater than the resistance of the second resistor block 92, the output of the resistor block array 9 may be "1". When the resistance of the first resistor block 91 is smaller than the resistance of the second resistor block 92, the output of the resistor block array 9 may be "0".

The resistor block array 9 may he coupled into a product to form the physically unclonable product. The product may include intelligent card, radio frequency identification card, and storage device, etc. The physically unclonable function of the resistor block array 9 may be used for cryptographic key generation, memoryless key storage, device authentication, PUF-based RFID for anti-counterfeiting and intellectual Property (IP) protection, etc.

In one embodiment, each resistor block may include at least two resistor block units: a first resistor block unit and a second resistor block unit. The two resistor block units may be parallel; and there may have a space between the two parallel resistor block units.

In certain embodiments, each resistor block may include two long-stripe resistor block units: a third resistor block unit and a fourth resistor block unit. The third resistor block unit and the fourth resistor block unit may connect to each other; and the width of the third resistor block unit may be greater than the width of the fourth resistor block unit.

In certain embodiments, the critical dimension of the top of the resistor block may be smaller than critical dimension of the bottom of the resistor block.

All or partial of the above described methods and steps may be performed by related hardware operated by corresponding software programs. The programs may be stored in a computer readable media. The computer readable media may include ROM, RAM, disk and CD, etc.

Thus, according to the disclose methods and structures, a resistance randomization process may be performed on resistor blocks. Then, two or more resistor blocks with the randomized resistances may be used to form a resistor block array. Then, at least one such resistor block array may be disposed in a product; and a physically unclonable product may be formed. Because the resistances of the resistor blocks may be completely random, i.e., the resistances of the resistor blocks formed by same parameters may be different. Thus, the uniqueness and unclonable function of the resistor block array may be ensured. Thus, the resistor block array may be able to he disposed in a product to form a physically unclonable product.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. A method for fabricating a physically unclonable product, comprising:
   forming a resistor block;
   performing a resistance randomizing process to the resistor block to cause the resistor block to have a random resistance;
   forming a resistor block array using at least two resistor blocks obtained after the resistance randomizing process; and
   coupling at least one resistor block array with a product to form the physically unclonable product.

2. The method according to claim 1, wherein:
   the at least two resistor blocks obtained after the resistance randomizing process include a first resistor block and a second resistor block;
   an output of the resistor block array is "1", when a resistance of the first resistor block is greater than a resistance of the second resistor block; and
   an output of the resistor block array is "0", when the resistance of the first resistor block is smaller than a resistance of the second resistor block.

3. The method according to claim 1, wherein performing the resistance randomizing process comprises:
   performing a photoresist treatment process to the resistor block by performing an adjustment operation to cause an energy of the photoresist treatment process to be unable to completely expose positions of a photoresist layer on the resistor block corresponding to need-to-be-exposed regions in a photomask.

4. The method according to claim 3, wherein the adjustment operation includes at least one of:
   adjusting an energy for exposing the photoresist layer on the resistor block; and
   adjusting sizes of the need-to-be-exposed regions in the photomask.

5. The method according to claim 1, wherein the resistor block comprises:
   at least two resistor block units,
   wherein:
      the at least two resistor block units are parallel; and
      the at least two resistor block units are separated by a space.

6. The method according to claim 5, wherein performing the resistance randomizing process comprises:
   performing an adjustment operation to cause the energy of the photoresist adjustment process to be unable to completely expose portions of a photoresist layer between two resistor block units corresponding to need-to-be-exposed regions on the photomask.

7. The method according to claim 6, wherein the adjustment operation comprises at least one of:
   adjusting an energy for performing the photoresist treatment on the resistor block; and
   adjusting sizes of the need-to-be exposed regions on the photomask.

8. The method according to claim 1, wherein the resistor block comprises:
   at least two long-stripe resistor block units,
   wherein:
      the at least two long-stripe resistor block units connect to each other; and
      a width of one long-stripe resistor block unit is greater than a width of another long-stripe resistor block unit.

9. The method according to claim 8, wherein performing the resistance randomizing process comprises:
   performing an adjustment operation to cause one of the long-stripe resistor block units to be bridged and another long-stripe resistor block unit to be broken.

10. The method according to claim 9, wherein the adjustment operation comprises at least one of:
    adjusting an energy of the photoresist treatment process to the resistor block; and
    adjusting a relative width between the long-stripe resistor block units.

11. The method according to claim 1, wherein the resistance randomizing process comprises:
doping the resistor block to cause doped regions in the resistor block to have a higher etching rate than undoped regions in the resistor block; and
etching the doped resistor block and adjusting etching parameters to cause the resistor block to have different critical dimensions at different positions.

12. The method according to claim 11, wherein:
a critical dimension of a top of the resistor block is smaller than a critical dimension of a bottom of the resistor block.

13. The method according to claim 1, wherein:
the resistor block is made of one of polysilicon and metal material.

14. A physically unclonable product, comprising:
a product; and
at least one resistor block array coupled with the product and including at least two resistor blocks having randomized resistances, wherein:
the at least two resistor blocks include a first resistor block and a second resistor block;
an output of the resistor block array is "1", when a resistance of the first resistor block is greater than a resistance the second resistor block; and
an output of the resistor block array is "0", when the resistance of the first resistor block is greater than the resistance of the second resistor block.

15. The physically unclonable product according to claim 14, wherein the resistor block comprises:
at least two resistor block units,
wherein:
the at least two resistor block units are parallel to each other; and
the at least two resistor block units are separated by a space.

16. The physically unclonable product according to claim 14, wherein the resistor block comprises:
at least two long-stripe resistor block units,
wherein
the at least two long-stripe resistor block units connect to each other; and
a width of one long-stripe resistor block unit is greater than a width of another long-stripe resistor block.

17. The physically unclonable product according to claim 14, wherein:
a critical dimension of a top of the resistor block is smaller than a critical dimension of a bottom of the resistor block.

18. The physically unclonable product according to claim 14, wherein:
the resistor block is a conductive plate having an electrical resistance.

19. The physically unclonable product according to claim 14, wherein the product comprises one of:
an intelligent card, a radio frequency identification card, and a storage device.

* * * * *